May 19, 1942.   T. C. LENNOX   2,283,741
CONTROL SYSTEM
Filed April 2, 1941
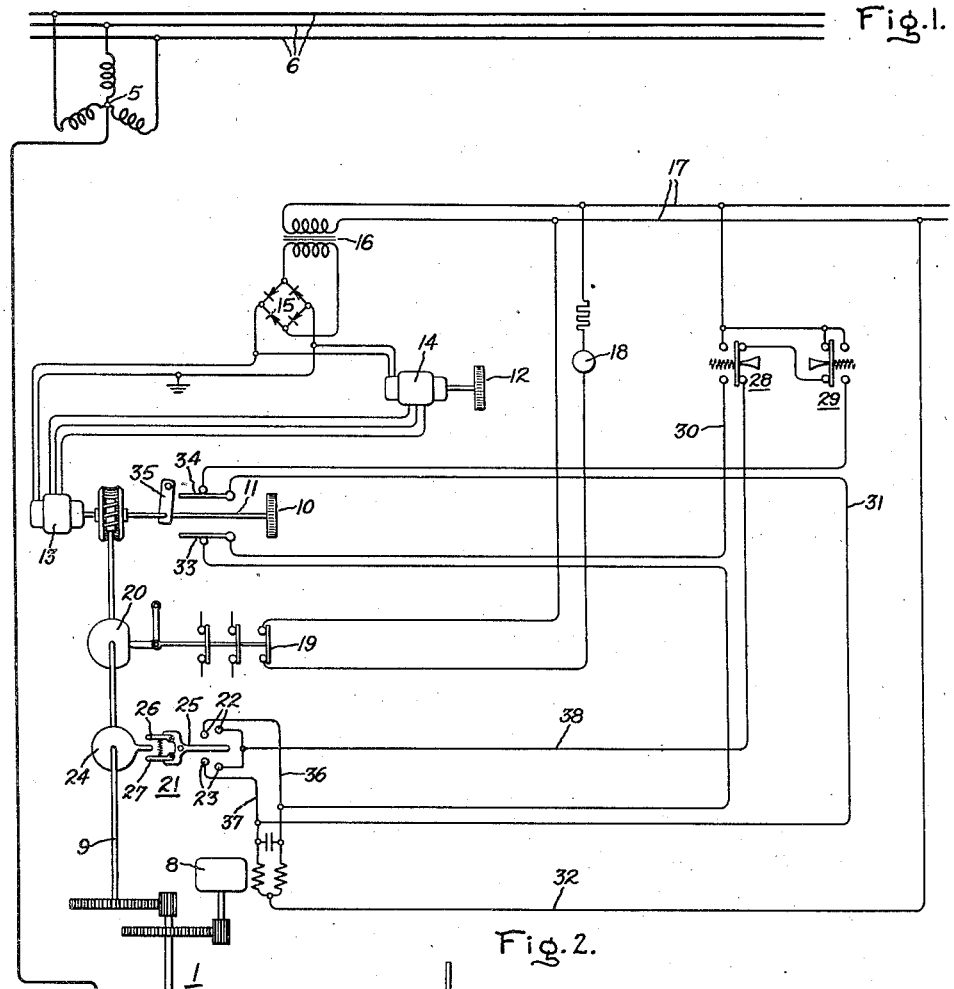
Inventor:
Thomas C. Lennox,
by Harry E. Dunham
His Attorney.

UNITED STATES PATENT OFFICE 2,283,741

CONTROL SYSTEM

Thomas C. Lennox, Pittsfield, Mass., assignor to General Electric Company, a corporation of New York Application April 2, 1941, Serial No. 386,507

8 Claims. (Cl. 171—242)

This invention relates to control systems and more particularly to improvements in automatic electrical positioning systems for motor-driven devices.

Many movable motor-driven devices are adapted to be moved from position to position or from station to station and in most of these situations it is desirable that the device be accurately positioned at any desired position or station. For example, tap-changing switches should be movable from any tap contact to another tap contact and it is obviously desirable to have the driving mechanism for the moving contact stop the moving contact quickly and accurately in full contact with the desired tap contact. This invention has been developed primarily for controlling the tap-changing switch of a ground fault neutralizer or a so-called Petersen coil. These coils have a high impedance and are connected between ground and the neutral point of an ungrounded polyphase alternating current system. Its function is to clear arcing grounds caused by the capacitance current of the system and it does so by neutralizing the capacitance current by means of a substantially equal and opposite inductance current. In this manner arcing grounds on ungrounded neutral systems are suppressed. By reason of certain switching operations which take place from time to time the system capacity to ground will often be substantially changed and consequently for full protection it is necessary that the Petersen coil inductance be correspondingly changed and it is for this reason that the Petersen coil is provided with tap-changing means so that adjustable amounts of coil can be cut out of the circuit.

The invention, however, is obviously not limited to use with Petersen coils or even with tap-changing switches for other kinds of windings and is generally useful for positioning all sorts of movable devices which have a plurality of stations at any one of which it is desirable that they be accurately positioned.

An object of the invention is to provide a new and improved electrical control system.

Another object of the invention is to provide a novel and simple automatic positioning system.

The invention will be better understood from the following description taken in connection with the accompanying drawing and its scope will be pointed out in the appended claims.

In the drawing Fig. 1 illustrates diagrammatically an embodiment of the invention and Fig. 2 illustrates a modified form of directional responsive control switch.

Referring now to Fig. 1 of the accompanying drawing, the movable device is a tap-changing switch 1 having a movable contact 2 for selectively engaging tap contacts 3 on a Petersen coil 4 connected between ground and the neutral 5 of a three-phase system 6. The movable contact is operated by a screw threaded shaft 7 which is driven by a reversible motor 8 of the well-known single-phase capacitor type. Geared to the shaft 7 is an auxiliary shaft 9 which makes one revolution for each complete tap change, that is to say, for each movement of the contact 2 from one fixed contact 3 to the next adjacent fixed contact.

For indicating locally the position of the movable contact there is provided a dial indicator 10 carried by a transverse shaft 11 geared to the auxiliary shaft 9. For giving a remote indication of the position of the tap changer there is a remote dial indicator 12 which is electrically coupled to the shaft 11 by means of well-known electrical self-synchronizing devices comprising a transmitter 13 and a receiver 14, the two being excited with direct current through a rectifier 15 and a step-down transformer 16 from a suitable auxiliary supply circuit 17.

For giving a more positive indication than is given by the indicators 10 and 12 whenever the tap-changing switch is close to or exactly in a proper contact-making position a lamp or auxiliary indicator 18 is provided. This indicator is energized by the auxiliary circuit 17 and is controlled by a switch 19 which is operated by a cam 20 on the shaft 9. The arrangement is such that the switch 19 is open for all intermediate positions of the tap-changing switch and is closed only when the tap-changing switch is in a proper contact-making position.

For automatically positioning the tap-changing switch there is provided a directional responsive switching device 21 having two sets of contacts 22 and 23 respectively. This device is driven by a cam-like member 24 on the shaft 9 and is so arranged that it only changes its position when the tap-changing means passes through a full contact-making position in the opposite direction to that in which it last passed through that position. For example, so long as the tap-changing switch is moving from position to position or from station to station the directional responsive switch 21 will stay in one position and one of its sets of contacts will remain closed and the other set will remain open.

If now the direction of operation of the tap-changing switch is reversed the directional responsive switch will change positions at the moment that the tap-changing switch passes through its last full contact-making position in the reverse direction, in which case the condition of its sets of contacts will reverse and the previously closed sets of contacts will open and the previously open sets of contacts will close. In the simplified schematic arrangement shown in the drawing this is accomplished by a pivotally mounted switch arm 25 having two arms 26 and 27 between which moves a projection on the cam-like member 24. By means of this arrangement rotation of the cam member 24 in a counterclockwise direction will cause the projection on the member 24 to engage the arm 26, thereby closing the contacts 23 and so long as rotation continues in the same direction nothing further will happen. However, if the direction of rotation of the cam member 24 is reversed the projection on this cam member will engage the arm 27 as soon as the tap-changing switch returns to the full contact-making position it had last passed through whereupon the switch arm will be moved so as to close the contacts 22 and open the contacts 23 and no further change will take place so long as the direction of rotation is not changed.

The motor 8 is selectively operated in either direction by any suitable means, such as by push button swtches 28 and 29. The switch 28, which for purposes of description will be termed the forward direction control switch, has a set of normally open contacts connected in a circuit 30 for controlling the forward direction of rotation of the motor and similarly push button 29 has a set of normally open contacts connected in a circuit 31 for controlling the reverse direction of operation of the motor 8. These two circuits are energized from the supply circuit 17, the return connection from the motor being by way of conductor 32.

In order to prevent injury to the apparatus suitable limit switches 33 and 34 are connected respectively in the forward and reverse direction controlling circuits. These switches are normally closed and are actuated by a lever 35 on the transverse shaft 11 whenever the tap-changing switch reaches one or the other of its limits of travel.

The automatic positioning control consists of additional direction controlling circuits for the motor 8 under the respective control of the contacts 22 and 23, the contacts 22 controlling a second forward direction circuit 36 and the contacts 23 controlling a second reverse direction circuit 37, these circuits having the common supply conductor 38 which is completed through serially connected sets of normally closed back contacts on the push button switches 28 and 29.

The operation of the illustrated embodiment of the invention is as follows: It will be assumed that the forward direction of rotation of the motor 8 causes the movable contact 2 of the tap-changing switch to move in a downward direction and causes the cam member 24 to turn in a counterclockwise direction. If now it is desired to increase the reactance of the Petersen coil 4 the push button 28 is depressed thereby completing the forward direction control circuit 30 of the motor through the limit contacts 33. As previously described, this will cause the directional responsive switching means to close its contacts 23 as soon as the tap-changing switch passes through a full tap contact position. The operator by observing the various indicators can tell when the tap-changing switch has reached the proper tap position. The push button 28 is maintained depressed until after the dial indicators indicate that the proper position has been reached until the lamp 18 lights up indicating that the next tap position is being approached. If then the push button is released a circuit will be completed through the two sets of back contacts in series and through the contacts 23 and the reverse direction circuit 37 thereby running the motor backwards and reversing the direction of the tap-changing switch. As soon as the tap-changing switch reaches exactly the correct position the contacts 23 will open. If the system comes to rest substantially immediately no further operation will take place and the switch will be accurately positioned. If, however, the inertia of the system or any lost motion in the connections should cause the system to overrun and pass beyond the correct position the contacts 22 will close thereby restarting the motor in the forward direction and bringing the movable contact of the switch back toward the proper position. As soon as the proper position is reached the contacts 22 will open. Ordinarily this will be sufficient to bring the system to rest in the correct position but it will be seen that the system will automatically adjust itself back and forth as much as required until the correct position has been reached, this back and forth operation taking place in what may be described as reverse decrements. The final position will be at random in any position between the closing points of 22 and 23 and the tap changing switch must be so designed as to be safely on position at any point within those limits.

Similarly, if it is desired to decrease the amount of reactance of the Petersen coil the switch 29 may be depressed whereby the tap-changing contact 2 will move upwardly and as soon as the switch 29 is released the movable contact 2 if not on an operating position will be run back to the last full contact-making position which it had passed through and will then be positioned by means of the directional responsive switch 21 in the manner previously described.

The cam 20 and switch 19 must be so arranged that 19 will be closed only within the range of motion between the closing of 22 and 23. The same applies to additional contact of 19 which may be used to interlock the mechanism with other devices such as a main circuit breaker.

It will be observed that the system described is such that as long as neither 28 nor 29 is depressed, the mechanism cannot rest on any position except in the zone between the closing of 22 and 23 and if it is left in any other position it will run back under the control of 21 to the last such position it had passed through.

It will also be noticed that should primary control switch 28 or 29 be released when the tap-changing means is in exactly the proper contact-making position, the directional responsive switch will automatically cause the mechanism to run back to the last full contact-making position through which the tap changer had passed. Where this is undesirable the directional responsive control switch may be modified as shown in Fig. 2 in which the cam member 24 instead of having a projection has a recess in which a roller on the pivoted switch arm 25 fits when the tap-changing mechanism is in full contact-making position. This position is illustrated in the figure and under these conditions the switch is in its intermediate position and both sets of contacts 22 and 23 are open. When the mechanism is operating in one direction the proper set of contacts 22 or 23 will be held closed at all times except when the mechanism is passing through a full contact-making position in which case the contacts will momentarily open and then reclose. Consequently, should the primary control switches 28 or 29 be released when the tap-changing mechanism is in a full contact-making position the mechanism will automatically come to rest on that tap-changing position and only when the push buttons 28 and 29 are released when the tap-changing mechanism is in an intermediate position will the automatic run back occur. The switch in Fig. 2 has the additional advantage over the directional responsive control switch of Fig. 1 that the contacts are positively maintained closed when the tap-changing means is in its off positions whereas in the switch of Fig. 1 friction is relied upon to hold the contacts closed once they have been closed by the cam.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent in the United States is:

1. In combination, a movable device having a plurality of stations at any one of which it is to be accurately positioned, a motor for driving said device, an indicator for signifying which of said stations said device is nearest to, manually actuable means for selectively causing said motor to drive said device in either direction, and means responsive to the release of said manually actuable means when said device is between two stations for automatically reversing said motor and running said device back to the last station it has passed, said last-mentioned means including a normally closed double-throw switch for controlling the direction of operation of said motor and being operable from one throw to the other whenever said device returns to the last station it has previously passed.

2. In combination, a movable device having a plurality of stations at any one of which it is to be accurately positioned, a motor for driving said device, an indicator for signifying which of said stations said device is nearest to, a second indicator for signifying when said device is at any station, manually actuable means for selectively causing said motor to drive said device in either direction, and automatic means responsive to the release of said manually actuable means when said second indicator signifies that said device has reached or passed a station for positioning said device exactly at such station, said automatic means including a normally closed double-throw switch for controlling the direction of operation of said motor and being operable from one throw to the other whenever said device returns to the last station it has previously passed.

3. In combination, a movable device having a plurality of stations at any one of which it is to be accurately positioned, a motor for driving said device in either direction, a pair of parallel circuits for separately controlling the forward direction of operation of said motor, a pair of parallel circuits for separately controlling the reverse direction of operation of said motor, a manually operable forward push button switch having a pair of normally open contacts connected in one of said forward direction controlling circuits, a manually operable reverse push button switch having a pair of normally open contacts connected in one of said reverse direction controlling circuits, said push buttons having normally closed pairs of back contacts serially connected in both of the remaining direction controlling circuits, three-position directional responsive switching means having two sets of contacts one of which is open and the other of which is closed in one of its extreme positions and said one set being closed and said other set being open when it is in the other of its extreme positions and both of which are open in its intermediate position, means for shifting the position of said switching means from one extreme position to the other whenever said movable device passes one of its stations when moving in the opposite direction to that in which it last passed said station, said sets of contacts of said switching means being so connected respectively in said remaining direction controlling circuits that if either push button is depressed and is subsequently released while said movable device is between stations said motor will automatically be run back until said movable device is accurately located at the last station which it has passed.

4. In combination, a movable device having a plurality of stations at any one of which it is to be accurately positioned, a motor for driving said device in either direction, indicating means driven by said motor for indicating the location of said device relative to said stations, a pair of parallel circuits for separately controlling the forward direction of operation of said motor, a pair of parallel circuits for separately controlling the reverse direction of operation of said motor, a manually operable forward push button switch having a pair of normally open contacts connected in one of said forward direction controlling circuits, a manually operable reverse push button switch having a pair of normally open contacts connected in one of said reverse direction controlling circuits, said push buttons having normally closed pairs of back contacts serially connected in both of the remaining direction controlling circuits, three-position directional responsive switching means having two sets of contacts one of which is open and the other of which is closed in one of its extreme positions and said one set being closed and said other set being open when it is in the other of its extreme positions and both of which are open in its intermediate position, means for shifting the position of said switching means from one extreme position to the other whenever said movable device passes one of its stations when moving in the opposite direction to that in which it last passed said station, said sets of contacts of said switching means being so connected respectively in said remaining direction controlling circuits that if either push button is depressed and is subsequently released while said movable device is between stations said motor will automatically be run back until said movable device is accurately located at the last station which it has passed.

5. In combination, a movable device having a plurality of stations at any one of which it is to be accurately positioned, a motor for driving said device in either direction, a pair of parallel circuits for separately controlling the forward direction of operation of said motor, a pair of parallel circuits for separately controlling the reverse direction of operation of said motor, a manually operable forward push button switch having a pair of normally open contacts connected in one of said forward direction controlling circuits, a manually operable reverse push button switch having a pair of normally open contacts connected in one of said reverse direction controlling circuits, normally closed limit switches which are opened respectively when said device reaches the end of its travel in either direction connected respectively in said last mentioned direction controlling circuits, said push buttons having normally closed pairs of back contacts serially connected in both of the remaining direction controlling circuits, three-position directional responsive switching means having two sets of contacts one of which is open and the other of which is closed in one of its extreme positions and said one set being closed and said other set being open when it is in the other of its extreme positions and both of which are open in its intermediate position, means for shifting the position of said switching means from one extreme position to the other whenever said movable device passes one of its stations when moving in the opposite direction to that in which it last passed said station, said sets of contacts of said switching means being so connected respectively in said remaining direction controlling circuits that if either push button is depressed and is subsequently released while said movable device is between stations said motor will automatically be run back until said movable device is accurately located at the last station which it has passed.

6. In combination, a multi-position tap-changing switch, a motor for driving said switch in either direction, a pair of parallel circuits for controlling the forward direction of operation of said motor, a pair of parallel circuits for controlling the reverse direction of operation of said motor, a manually operable forward push button switch having a pair of normally open contacts connected in one of said forward direction controlling circuits, a manually operable reverse push button switch having a pair of normally open contacts connected in one of said reverse direction controlling circuit, said push buttons having normally closed pairs of back contacts serially connected in both of the remaining direction controlling circuits, multi-position directional responsive switching means having two sets of contacts one of which is open and the other of which is closed in one of its extreme positions and said one set being closed and said other set being open when it is in the other of its extreme positions and both of which are open in its intermediate position, means for shifting the position of said switching means from one extreme position to the other whenever said tap-changing switch passes through a tap contacting position in the opposite direction to that in which it last passed through a tap contacting position, said sets of contacts of said switching means being so connected respectively in said remaining direction controlling circuits that if either push button is depressed and is subsequently released while said movable device is between stations said motor will automatically be run back until said tap-changing means is accurately located at the last tap contacting position it passed through.

7. In combination, a movable device having a plurality of stations at any one of which it is to be accurately positioned, a motor for driving said device from station to station, primary control means for selectively energizing said motor for either direction of operation, secondary control means responsive to the deenergization of said motor by said primary control means for automatically energizing said motor for operation in the opposite direction to that in which said primary control means last caused it to operate until said device reaches a station, and additional means responsive to said device passing said station in said opposite direction for reversing said motor until said device returns to said station, said secondary control means again reversing said motor if said device again overruns said station whereby said device is automatically positioned accurately at said station in a series of reverse decrements.

8. In combination, a movable device having a plurality of stations at any one of which it is to be accurately positioned, a motor for driving said device from station to station, separate circuits for controlling respectively the energization of said motor in opposite directions, separate sets of contacts for respectively making and breaking said circuits, means responsive to a reversal of said device for opening one set of contacts and closing the other set as soon as said device passes a station, said closing contacts being in the control circuit which causes said device to return to said passed station, additional control circuits for controlling respectively the direction of operation of said motor, and means responsive to the energization of either of said additional control circuits for open-circuiting both first-mentioned control circuits.

THOMAS C. LENNOX.